(12) United States Patent
Zhang

(10) Patent No.: US 11,340,721 B2
(45) Date of Patent: May 24, 2022

(54) USER-INTERFACE ASSEMBLY AND METHOD FOR INTEGRATING TOUCH ASSEMBLY INTO USER-INTERFACE ASSEMBLY

(71) Applicant: Fresenius Medical Care Deutschland GmbH, Bad Homburg (DE)

(72) Inventor: Hao Zhang, Shanghai (CN)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 0 days.

(21) Appl. No.: 16/607,848

(22) PCT Filed: Apr. 24, 2017

(86) PCT No.: PCT/CN2017/081596
§ 371 (c)(1),
(2) Date: Oct. 24, 2019

(87) PCT Pub. No.: WO2018/195684
PCT Pub. Date: Nov. 1, 2018

(65) Prior Publication Data
US 2020/0192499 A1   Jun. 18, 2020

(51) Int. Cl.
*G06F 3/041* (2006.01)
*B32B 7/12* (2006.01)

(52) U.S. Cl.
CPC .............. *G06F 3/041* (2013.01); *B32B 7/12* (2013.01); *B32B 2457/208* (2013.01); *G06F 2203/04103* (2013.01)

(58) Field of Classification Search
None
See application file for complete search history.

(56) References Cited

U.S. PATENT DOCUMENTS

| 8,749,492 B2 | 6/2014 | Kotera et al. |
| 2008/0246741 A1 | 10/2008 | Hinata |

(Continued)

FOREIGN PATENT DOCUMENTS

| CN | 203720827 U | 7/2014 |
| JP | 2007-316847 A | 12/2007 |

(Continued)

OTHER PUBLICATIONS

International Search Report and Written Opinion in Application No. PCT/CN2017/081596, dated Feb. 5, 2018, 6 pages.

(Continued)

*Primary Examiner* — Ifedayo B Iluyomade
(74) *Attorney, Agent, or Firm* — Fish & Richardson P.C.

(57) ABSTRACT

A user-interface assembly disclosed herein comprises: a supporting frame; a part for providing a switch function to the user-interface assembly and to be received in a recess formed in the supporting frame; and an overlay for covering and adhering to an upper surface of the supporting frame and an upper surface of the part by a back adhesive when the part is received in the recess; wherein a transition zone is provided around the part under the overlay, which transition zone extends at least from a sidewall of the recess toward the part such that the overlay can smoothly transit from the upper surface of the supporting frame to the upper surface of the part. Also disclosed herein is a corresponding method for integrating a touch assembly into a user-interface assembly. A flat design of a user-interface assembly can be achieved in a cost effective manner.

17 Claims, 3 Drawing Sheets

(56) References Cited

U.S. PATENT DOCUMENTS

| | | | |
|---|---|---|---|
| 2010/0281410 A1* | 11/2010 | Heintze | G06F 3/0219 |
| | | | 715/769 |
| 2011/0228192 A1* | 9/2011 | Hollaway | G02F 1/13338 |
| | | | 349/58 |
| 2015/0071465 A1 | 3/2015 | Zalisk et al. | |
| 2016/0041679 A1 | 2/2016 | Ahn et al. | |
| 2016/0049266 A1* | 2/2016 | Stringer | H01H 13/88 |
| | | | 200/5 A |
| 2017/0069443 A1 | 3/2017 | Wang et al. | |

FOREIGN PATENT DOCUMENTS

| | | |
|---|---|---|
| JP | 2009-176628 A | 8/2009 |
| JP | 2011-118657 A | 6/2011 |
| JP | 2012-173855 A | 9/2012 |
| JP | 2013-205917 A | 10/2013 |
| JP | 2014-164686 A | 9/2014 |
| JP | 2017-050068 A | 3/2017 |

OTHER PUBLICATIONS

International Preliminary Report on Patentability in Application No. PCT/CN2017/081596, dated Oct. 29, 2019, 4 pages.
EP Extended European Search Report in European Appln. No. 17907261.6, dated Oct. 23, 2020, 9 pages.

* cited by examiner

USER-INTERFACE ASSEMBLY AND METHOD FOR INTEGRATING TOUCH ASSEMBLY INTO USER-INTERFACE ASSEMBLY

CROSS-REFERENCE TO RELATED APPLICATIONS

The present application is the national stage entry of International Patent Application No. PCT/CN2017/081596, filed on Apr. 24, 2017.

TECHNICAL FIELD

The present disclosure relates to a user-interface assembly and a method for integrating a touch assembly into a user-interface assembly.

BACKGROUND ART

A touch screen and a membrane switch are usually incorporated into electrical systems as user input devices. They are usually integrated with a supporting frame or an enclosure part to form a user-interface assembly of an electrical system. For cosmetic demanding applications or other demanding applications like requirement of water or dust proof, seamless and flat design is required for an outer surface of the user interface assembly.

The seamless design is generally achieved by adhesively laminating a flexible cover sheet or overlay onto the entire outer surface of the user-interface assembly. Because of manufacturing tolerances of thickness dimensions of the touch screen and the membrane switch, as well as tolerances of corresponding dimensions of the supporting frame, there is always a challenge when trying to achieve a visually flat appearance of the overlay covering the touch screen, the membrane switch, and the supporting frame. More specifically, the challenge to achieve a visually flat appearance of the overlay comes from the mismatched dimensions (height difference) between the touch screen and the corresponding recess on the supporting frame, and the mismatched dimensions between the membrane switch and the corresponding recess on the supporting frame.

FIG. 1 shows a partial sectional view of a portion of the user-interface assembly according to the prior art. As shown in FIG. 1, the user-interface assembly has a visually unflat appearance.

One approach known to the person skilled in the art is to control the tolerance of each part to a smallest level. However, strict tolerance control inevitably increases the manufacturing cost.

Another known approach to integrate the touch screen and switch keys providing a flat design is to etch circuits of the switch onto the indium tin oxide (ITO) layer of the touch screen. It eliminates layers of membrane switch and thus avoids the unflatness caused by the mismatched dimensions between the membrane switch and the supporting frame. However, the special process of etching customized switch circuits onto the touch screen is considerably expensive compared to the commonly used membrane switch. Moreover, the unflatness caused by the mismatched dimensions between the touch screen and the supporting frame is still not resolved.

SUMMARY OF THE DISCLOSURE

In view of the problems existing in the prior art, an object of the present disclosure is to provide a user-interface assembly and a method for integrating a touch assembly into a user-interface assembly.

For achieving this object, in one aspect, provided is a user-interface assembly, comprising: a supporting frame; a part for providing a switch function to the user-interface assembly and to be received in a recess formed in the supporting frame; and an overlay for covering and adhering to an upper surface of the supporting frame and an upper surface of the part by a back adhesive when the part is received in the recess; wherein a transition zone is provided around the part under the overlay, which transition zone extends at least from a sidewall of the recess toward the part such that the overlay can smoothly transit from the upper surface of the supporting frame to the upper surface of the part.

According to an optional embodiment, the transition zone is achieved at least by forming an adhesive-free zone such that the overlay can not be adhered to a portion of the upper surface of the supporting frame and/or a portion of the upper surface of the part in the transition zone.

According to an optional embodiment, the transition zone is achieved at least by a flexible portion of a top layer of the part extending outward from a body of the part, wherein the flexible portion has a smaller thickness than a thickness of the body.

According to an optional embodiment, the adhesive-free zone is formed by removing a corresponding portion of the back adhesive.

According to an optional embodiment, in an assembled state, the back adhesive is adhered to the flexible portion; and/or the part is formed by laminating a serial of individual layers.

According to an optional embodiment, a thickness of a thickest portion of the part can be equal to, bigger or smaller than a depth of the recess.

According to an optional embodiment, the user-interface assembly further comprises a touch screen which is received in an additional recess formed in the supporting frame.

According to an optional embodiment, the part is a hard printed circuit board.

According to an optional embodiment, the part is a membrane switch.

In another aspect, provided is a method for integrating a touch assembly into a user-interface assembly, the touch assembly having a top surface and a bottom surface, the user-interface assembly having a supporting frame and a recess for receiving the touch assembly, and the method comprising: placing the top surface of the touch assembly on a flat table; positioning the supporting frame at a predetermined position relative to the touch assembly such that at least one portion of the touch assembly is located within the recess; and injecting a flowable adhesive into a gap between the portion of the touch assembly and a corresponding portion of the recess from a direction of a bottom of the supporting frame to fix the touch assembly onto the supporting frame, so that an amount of the injected flowable adhesive can be adapted according to a different volume of the gap.

According to an optional embodiment, the touch assembly integrates a touch screen and an overlay covering and adhering to the touch screen.

According to an optional embodiment, positioning the supporting frame comprises: placing and adhering a top surface of the supporting frame onto a portion of the overlay extending out of the touch screen; and/or before injecting the flowable adhesive, placing a weight body onto a backside of the touch screen.

According to an optional embodiment, the flowable adhesive is injected into the gap via injection ports formed in the supporting frame.

According to an optional embodiment, the injection ports have round shapes or slot shapes.

According to the present disclosure, a flat design of a user-interface assembly can be achieved in a cost effective manner.

BRIEF DESCRIPTION OF THE DRAWINGS

The present disclosure and advantages thereof will be further understood by reading the following detailed description of some preferred exemplary embodiments with reference to the drawings in which.

DETAILED DESCRIPTION OF PREFERRED EMBODIMENTS

Some exemplary embodiments of the present disclosure will be described hereinafter in more details with reference to the drawings to better understand the basic concept of the present disclosure.

Figure 1:
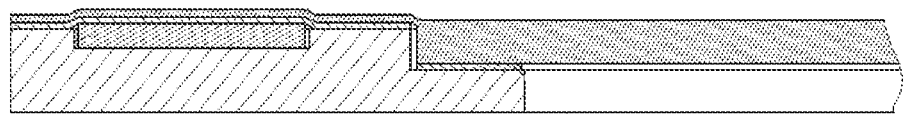
FIG. 1 shows a partial sectional view of a portion of the user-interface assembly according to the prior art.
Figure 2:
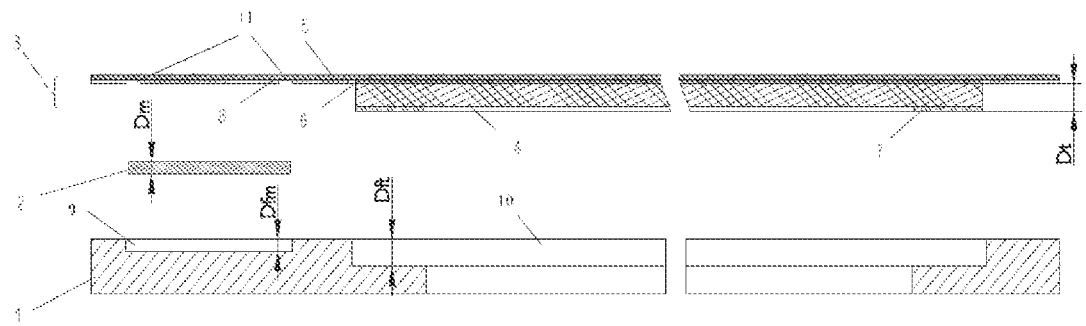
FIG. 2 shows an exploded sectional view of a user-interface assembly having seamless design, according to the first exemplary embodiment of the present disclosure.

FIG. 2 shows an exploded sectional view of a user-interface assembly having seamless design, according to the first exemplary embodiment of the present disclosure.

As shown in FIG. 2, the user-interface assembly mainly comprises a supporting frame 1, a part 2 and a touch assembly 3. It shall be noted that the part 2 is normally but not limited to an apparatus for providing a switch function to the user-interface assembly, which could be a flexible component like a membrane switch or a hard device like a printed circuit board in the first embodiment. To simplify the following description, a membrane switch is taken as an example in the first embodiment. The touch assembly 3 mainly comprises a touch screen 4, an overlay 5 larger than the touch screen 4, an optical clear adhesive 6 disposed between the touch screen 4 and the overlay 5 and used for adhering the overlay 5 to the touch screen 4, a first back adhesive 7 disposed on a backside of the touch screen 4 and used for adhering the touch screen 4 to the supporting frame 1, and a second back adhesive 8 disposed on a backside of a portion of the overlay 5 extending beyond the touch screen 4 and used for adhering the portion of the overlay 5 to the supporting frame 1 and the membrane switch 2.

The overlay 5 is usually a flexible polyester film having a thickness ranging from 0.1 mm to 0.3 mm, such as of 0.13 mm, 0.18 mm, or 0.25 mm.

Also can be seen from FIG. 2, a first recess 9 is formed in the supporting frame 1 for receiving the membrane switch 2 and a second recess 10 is formed in the supporting frame 1 for receiving the touch screen 4. A thickness of the membrane switch 2 is shown as Dm, while a depth of the first recess 9 is shown as Dfm. A distance between a bottom of the first back adhesive 7 and a bottom of the second back adhesive 8 is shown as Dt, while a depth of the second recess 10 is shown as Dft. Ideally, Dm and Dt should be nominally equal to Dfm and Dft respectively, to achieve a completely flat appearance on an outer surface of the overlay 5.

However, during manufacturing process, these dimensions Dm, Dfm, Dt and Dft have respective tolerances. As known by the person skilled in the art, a tolerance for Dm, Dfm or Dft may be +/−0.1 mm, +/−0.15 mm, or +/−0.2 mm, and a tolerance for Dt may be +/−0.15 mm, +/−0.2 mm, +/−0.25 mm, +/−0.3 mm, or +/−0.4 mm. If these dimensions are not matched properly, the overlay 5 may have visually unflat appearance, in particular at sidewalls defining the first recess 9 and the second recess 10.

To achieve visually flat appearance of the overlay 5 at the membrane switch 2, as shown in FIG. 2, an adhesive-free transition zone 11 is provided above the membrane switch 2 adjacent to the sidewall of the first recess 9, preferably along the entire sidewall of the first recess 9.

Figure 3:
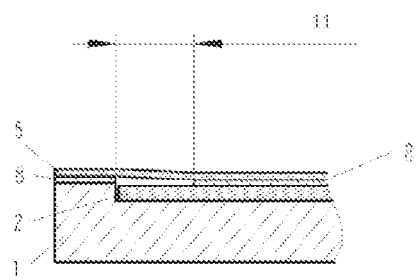
FIG. 3 shows a partial sectional view of a portion of the user-interface assembly in an assembled state.

FIG. 3 shows a partial sectional view of a portion of the user-interface assembly in an assembled state. As shown in FIG. 3, the adhesive-free transition zone 11 is embodied as a cutout, preferably an annular cutout along the entire sidewall of the first recess 9.

An outer periphery of the adhesive-free transition zone 11 is preferably aligned with the sidewall of the first recess 9. According to another optional embodiment of the present disclosure, the adhesive-free transition zone 11 is formed across the sidewall of the first recess 9 so as to extend outward beyond the first recess 9. A width of the adhesive-free transition zone 11 may be selected based on a desired flatness on the outer surface of the overlay 5. The width of the adhesive-free transition zone 11 may be set to be 3 mm, 3.5 mm, 4 mm, 4.5 mm or other non-limiting values.

Figure 4:
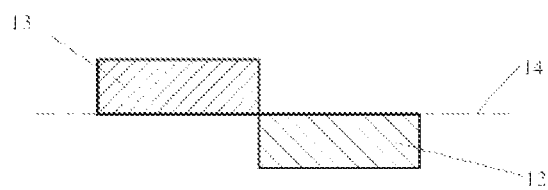
FIG. 4 schematically shows a tolerance zone for a thickness of a membrane switch and a tolerance zone for a depth of a first recess for receiving the membrane switch, according to an exemplary embodiment of the present disclosure.

For the embodiment shown in FIG. 3, a tolerance zone 12 for the thickness Dm of the membrane switch 2 and a tolerance zone 13 for the depth Dfm of the first recess 9 may preferably be selected as shown in FIG. 4, wherein the thickness Dm of the membrane switch 2 and the depth Dfm of the first recess 9 have the same nominal value 14 and the tolerance zone 13 for the depth Dfm is above the tolerance zone 12 for the thickness Dm, which means that the depth Dfm of the first recess 9 is at least equal to the thickness Dm of the membrane switch 2. With this tolerance zone setting, the assembled state as shown in FIG. 3 may be achieved. During assembling, the membrane switch 2 is firstly placed into and adhered to the first recess 9 by a bottom adhesive layer (not shown separately) of the membrane switch 2. Then, the overlay 5 with the second back adhesive 8 is adhered onto the supporting frame 1 and the membrane switch 2. The adhesive-free transition zone 11 allows the overlay 5 to smoothly transit from the supporting frame 1 to the membrane switch 2, thus making the unflatness of the overlay 5 visually imperceptible.

Because the second back adhesive 8 has a certain thickness, the membrane switch 2 and the first recess 9 also may use other tolerance zone settings, as long as the tolerance zone settings can ensure that the thickness of the membrane switch 2 is at most equal to the sum of the depth of the first recess 9 and the thickness of the second back adhesive 8.

Figure 5:
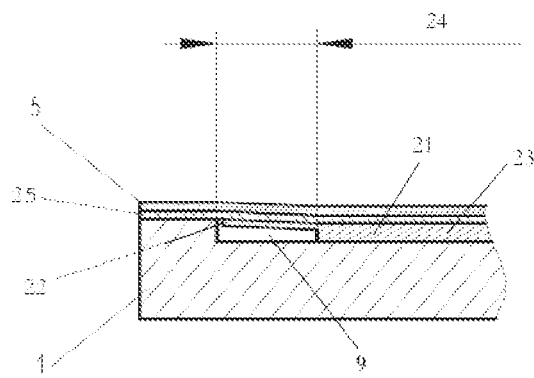
FIG. 5 shows a partial sectional view of a portion of the user-interface assembly in an assembled state, according to the second exemplary embodiment of the present disclosure.

FIG. 5 shows a partial sectional view of a portion of the user-interface assembly in an assembled state, according to the second exemplary embodiment of the present disclosure.

Figure 6:
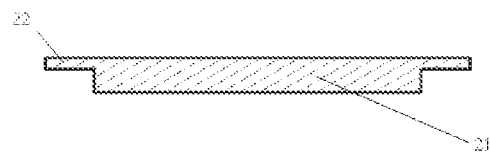
FIG. 6 shows a sectional view of a membrane switch according to an exemplary embodiment of the present disclosure.

In the second embodiment, it would be better to assemble a flexible component to perform the switch function as shown in FIG. 5. A membrane switch 21 is formed such that a flexible portion 22 extends outward from and in flush with a top of a body 23 of the membrane switch 21. The flexible portion 22 has a smaller thickness than the body 23. The flexible portion 22 preferably extends along the entire periphery of the body 23 so as to form a ring shape, as shown in FIG. 6 which shows a sectional view of the membrane switch 21. In the embodiment, the flexible portion 22 may form a transition zone 24 and a corresponding portion of the touch assembly has a back adhesive 25.

According to one exemplary embodiment of the present disclosure, the membrane switch 21 may be formed by laminating a serial of individual layers. For example, the layers from top to bottom may comprise a graphic layer as a top layer, an electro-static discharge (ESD) layer, a spacer layer, one or more circuit layers and a bottom adhesive layer. According to one exemplary embodiment of the present disclosure, the top layer of the membrane switch 21 is a flexible polyester layer with or without ESD shielding capability and therefore the top layer may be extended intentionally to create the transition zone. That is to say, a portion of the top layer acts as the flexible portion 22.

The flexible portion 22 may extend to the sidewall of the first recess 9 or be spaced from the sidewall by a distance. A width of the transition zone 24 is measured from the sidewall to the body 23, as shown in FIG. 5. The width of the transition zone 24 preferably may be set to be 3 mm, 3.5 mm, 4 mm, 4.5 mm or other non-limiting values.

In this case as shown in FIG. 5, a thickness of the membrane switch 21 is smaller than the depth of the first recess 9.

Figure 7:
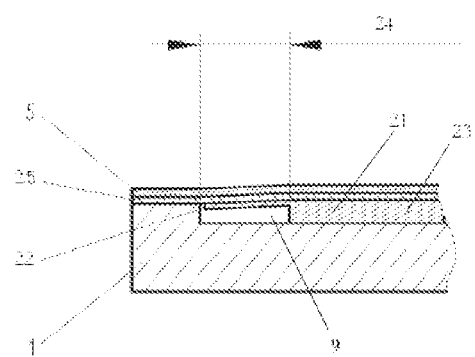
FIG. 7 shows another case based on the same concept as in FIG. 5 in a partial sectional view.

FIG. 7 shows another case based on the same concept as in FIG. 5 in a partial sectional view. However, in this case as shown in FIG. 7, the thickness of the membrane switch 21 is larger than the depth of the first recess 9.

In either case, the back adhesive 25 may keep continuously in the transition zone 24 and is adhered to the top layer of the membrane switch 21 without the need of being cut out as in FIG. 3. Because of the flexibility of the top layer of the membrane switch 21 in the transition zone 24, and also because of the absence of the bottom adhesive layer of the membrane switch 21 in the transition zone 24, the overlay 5 may smoothly transit from the supporting frame 1 to the membrane switch 21, thus making the unflatness of the overlay 5 visually imperceptible.

It should be noted that the flexible portion 22 even may be omitted such that the back adhesive 25 extends across a gap formed between the sidewall of the first recess and the membrane switch.

Figure 8:
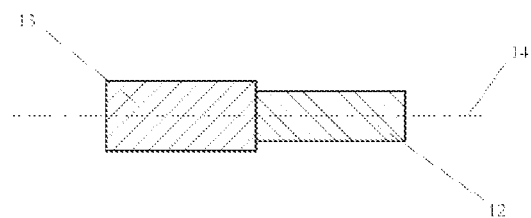
FIG. 8 schematically shows a tolerance zone for a thickness of the membrane switch and a tolerance zone for a depth of the first recess for receiving the membrane switch, according to an exemplary embodiment of the present disclosure.

For the cases as shown in FIG. 5 and FIG. 7, as shown in FIG. 8, the tolerance zone 13 for the depth of the first recess and the tolerance zone 12 for the thickness of the membrane switch preferably may be set symmetrically along the nominal value 14.

These embodiments described above are based on the same technical concept that a transition zone is created for example by forming a cavity under the overlay, which transition zone at least extends to the sidewall of the first recess such that the overlay can smoothly transit from the supporting frame to the membrane switch rather than change abruptly at the sidewall.

Of course, the technical concept also may be applied to transition at the sidewall of the second recess.

However, the touch assembly 3 is usually provided as a pre-assembled structure such that it is hard to apply the above technical concept. In this case, a method for integrating the touch assembly 3 into the user-interface assembly is provided, which method can achieve a flat appearance on the outer surface of the overlay 5. The method uses a thickness adjustable adhesion technique to achieve a flat appearance.

Figure 9:
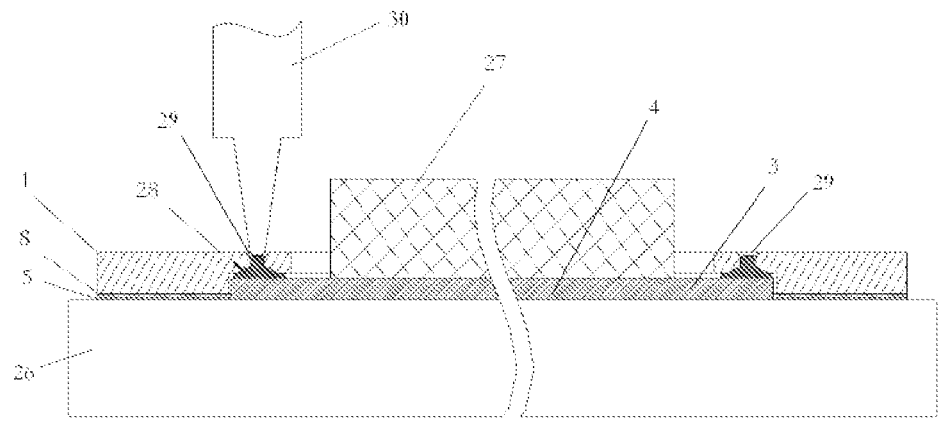
FIG. 9 shows a method for integrating a touch assembly into the user-interface assembly.

Specifically, as shown in FIG. 9, the touch assembly 3 (with the second back adhesive 8 on its overlay 5) is firstly placed upside down on a flat table 26. Then the supporting frame 1 is aligned, placed and adhered onto the overlay 5 of the touch assembly 3 via the second back adhesive 8. At this time, the touch screen 4 can still be moved up and down within the second recess of the supporting frame 1 due to the flexibility of the overlay 5. The assembling process continues by placing a weight body 27 onto the backside of the touch screen 4. The overlay 5 of the touch assembly 3 is now flatly mating with the flat table 26 under the pressure of the weight body 27. A flowable adhesive 28 is then injected into a gap between the backside of the touch screen 4 and a bottom of the second recess through injection ports 29 formed in the supporting frame 1 by any kind of adhesive injection tools 30.

In this case, the depth of the second recess should be larger than a distance between the backside of the touch screen 4 and the bottom of the second back adhesive 8.

It should be noted that although the membrane switch and the first recess are not shown in FIG. 9, they also may be incorporated into the user-interface assembly.

Figure 10:
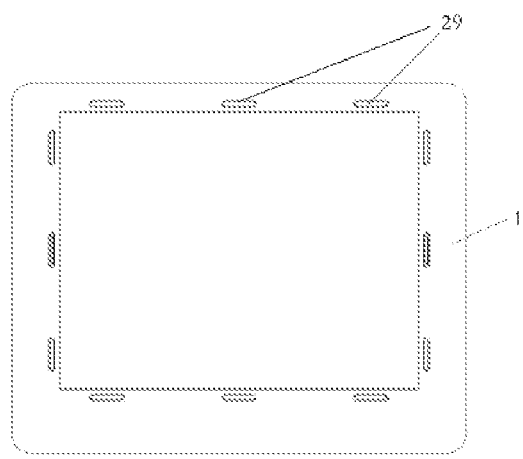
FIG. 10 shows one non-limiting example of injection ports having slot shapes in a bottom view.
Figure 11:
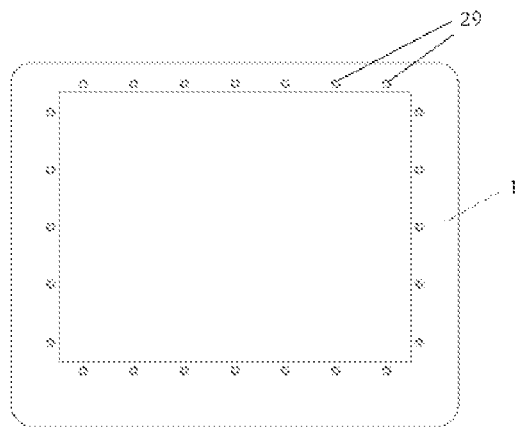
FIG. 11 shows another non-limiting example of the injection ports having round shapes in a bottom view.

FIG. 10 shows one non-limiting example of the injection ports 29 that have slot shapes. FIG. 11 shows another non-limiting example of the injection ports 29 that have round shapes. It should be understood by the person skilled in the art that the injection port may have any suitable shape.

Of course, the thickness adjustable adhesion technique also may be used to integrate the membrane switch into the user-interface assembly, for example by forming at least one injection port extending to the bottom of the first recess. In this case, the bottom adhesive layer of the membrane switch may be omitted.

While certain embodiments have been described, these embodiments have been presented by way of example only, and are not intended to limit the scope of the present disclosure. The attached claims and their equivalents are intended to cover all the modifications, substitutions and changes as would fall within the scope and spirit of the present disclosure.

The invention claimed is:

1. A user-interface assembly, comprising: a supporting frame comprising: a top surface; sidewalls; and a recess defined by the sidewalls and having a depth, the recess sized to receive a part; the part comprising an upper surface and a bottom surface, wherein: the part is configured to provide a switch function to the user-interface assembly, the part is disposed in the recess of the supporting frame and the bottom surface of the part is adhered to the recess by a bottom adhesive layer so that the part is not movable relative to the recess, and the part, while free of external forces, has a thickness measured between the upper and bottom surfaces; an overlay configured to cover and adhere to the top surface of the supporting frame by a first back adhesive and to the upper surface of the part by a second back adhesive; and a transition zone disposed under the overlay, wherein the transition zone extends at least from the sidewall of the supporting frame toward the part such that, while the user-interface assembly is at rest, the overlay lies smoothly from the top surface of the supporting frame to the upper surface of the part so as to make an unflatness of the overlay at the transition zone visually imperceptible, wherein the thickness of the part is nominally equal to the depth of the recess such that the unflatness is caused by manufacturing tolerances of the recess and/or the part, and wherein the part is a hard printed circuit board or a membrane switch.

2. The user-interface assembly according to claim 1, wherein the transition zone is an adhesive-free zone on the overlay, such that the overlay does not adhere to a portion of the top surface of the supporting frame and a portion of the upper surface of the part in the transition zone.

3. The user-interface assembly according to claim 2, wherein the adhesive-free zone is formed by removing a corresponding portion of the second back adhesive.

4. The user-interface assembly according to claim 1, wherein the transition zone is an adhesive-free zone on the overlay, such that the overlay does not adhere to a portion of the top surface of the supporting frame or a portion of the upper surface of the part in the transition zone.

5. The user-interface assembly according to claim 1, wherein the transition zone is a flexible portion of a top layer of the part extending outward from a body of the part.

6. The user interface according to claim 5, wherein the flexible portion has a smaller thickness than a thickness of the body.

7. The user-interface assembly according to claim 5, wherein the back adhesive is adhered to the flexible portion and the part is formed by laminating a serial of individual layers.

8. The user-interface assembly according to claim 5, wherein the back adhesive is adhered to the flexible portion or the part is formed by laminating a serial of individual layers.

9. The user-interface assembly according to claim 1, wherein the thinnest portion of the part is smaller than the depth of the recess.

10. The user-interface assembly according to claim 1, wherein the recess is a first recess, wherein the user-interface assembly further comprises a touch screen, and wherein the supporting frame further comprises a second recess sized to receive the touch screen.

11. A method for integrating a touch assembly into a user-interface assembly comprising: a supporting frame comprising: a top surface; sidewalls; and a recess defined by the sidewalls and having a depth, the recess sized to receive a part; the part comprising an upper surface and a bottom surface, wherein: the part is configured to provide a switch function to the user-interface assembly, the part is disposed in the recess of the supporting frame and the bottom surface of the part is adhered to the recess by a bottom adhesive layer so that the part is not movable relative to the recess, and the part, while free of external forces, has a thickness measured between the upper and bottom surfaces; an overlay configured to cover and adhere to the top surface of the supporting frame by a first back adhesive and to the upper surface of the part by a second back adhesive; and a transition zone disposed under the overlay, wherein the transition zone extends at least from the sidewall of the supporting frame toward the part such that, while the user-interface assembly is at rest, the overlay lies smoothly from the top surface of the supporting frame to the upper surface of the part so as to make an unflatness of the overlay at the transition zone visually imperceptible, wherein the thickness of the part is nominally equal to the depth of the recess such that the unflatness is caused by manufacturing tolerances of the recess and/or the part, and wherein the part is a hard printed circuit board or a membrane switch, wherein the recess of the supporting frame is a first recess, the touch assembly having a top surface and a bottom surface, the supporting frame of the user-interface assembly further defining a second recess sized to receive the touch assembly, the method comprising: placing the top surface of the touch assembly on a flat surface; positioning the supporting frame at a predetermined position relative to the touch assembly such that at least one portion of the touch assembly is located within the second recess; and injecting a flowable adhesive into a gap between the at least one portion of the touch assembly and a corresponding portion of the second recess from a first direction to fix the touch assembly onto the supporting frame, wherein an amount of the injected flowable adhesive is adapted based on a volume of the gap.

12. The method according to claim 11, wherein the touch assembly comprises a touch screen and the method further comprises:
covering and adhering the overlay to the touch screen.

13. The method according to claim 12, wherein the positioning the supporting frame comprises:
adhering the top surface of the supporting frame onto a portion of the overlay extending out from the touch screen; and
before injecting the flowable adhesive, placing a weight body onto a backside of the touch screen.

14. The method according to claim 12, wherein the positioning the supporting frame comprises:
placing and adhering the top surface of the supporting frame onto a portion of the overlay extending out from the touch screen; or
before injecting the flowable adhesive, placing a weight body onto a backside of the touch screen.

15. The method according to claim 11, wherein the flowable adhesive is injected into the gap via injection ports formed in the supporting frame.

16. The method according to claim 15, wherein the injection ports have round shapes or slot shapes.

17. The method according to claim 11, wherein the first direction is a bottom direction relative to the supporting frame.

* * * * *

UNITED STATES PATENT AND TRADEMARK OFFICE
CERTIFICATE OF CORRECTION

PATENT NO. : 11,340,721 B2
APPLICATION NO. : 16/607848
DATED : May 24, 2022
INVENTOR(S) : Hao Zhang It is certified that error appears in the above-identified patent and that said Letters Patent is hereby corrected as shown below:

In the Claims

Column 7, Line 35, Claim 6, delete "user interface" and insert -- user-interface assembly --.

Signed and Sealed this
Thirteenth Day of June, 2023

Katherine Kelly Vidal
*Director of the United States Patent and Trademark Office*